US010216377B2

(12) United States Patent
Ozcan et al.

(10) Patent No.: US 10,216,377 B2
(45) Date of Patent: Feb. 26, 2019

(54) VISUAL REGRESSION ANALYSIS

(71) Applicant: MICROSOFT TECHNOLOGY LICENSING, LLC, Redmond, WA (US)

(72) Inventors: Abuzer Mirac Ozcan, Bellevue, WA (US); Rahul Lal, Redmond, WA (US); Marcelo Medeiros De Barros, Redmond, WA (US); Hazim Macky, Redmond, WA (US); Nathan Novielli, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 520 days.

(21) Appl. No.: 15/077,458

(22) Filed: Mar. 22, 2016

(65) Prior Publication Data

US 2017/0277374 A1 Sep. 28, 2017

(51) Int. Cl.
*G06F 3/0484* (2013.01)
*G06F 17/22* (2006.01)
*G06F 17/27* (2006.01)
*G06F 11/36* (2006.01)
*G06K 9/62* (2006.01)

(52) U.S. Cl.
CPC ........ *G06F 3/0484* (2013.01); *G06F 11/3688* (2013.01); *G06F 17/2211* (2013.01); *G06F 17/2288* (2013.01); *G06F 17/27* (2013.01); *G06K 9/6202* (2013.01)

(58) Field of Classification Search
CPC .................................................. G06F 3/0484
USPC ........................................................ 715/762
See application file for complete search history.

(56) References Cited

U.S. PATENT DOCUMENTS

| 2004/0243881 | A1* | 12/2004 | Wang | ...................... | G06F 21/53 714/37 |
| 2007/0011541 | A1* | 1/2007 | Kogan | ................ | G06F 11/3672 714/737 |
| 2008/0163165 | A1* | 7/2008 | Shitrit | ..................... | G06F 8/315 717/107 |
| 2011/0239214 | A1* | 9/2011 | Frields | ................ | G06F 9/45533 718/1 |
| 2012/0218374 | A1* | 8/2012 | Matula | ................ | H04L 65/1006 348/14.12 |

(Continued)

OTHER PUBLICATIONS

"International Search Report and Written Opinion Issued in PCT Application No. PCT/US2017/019362", dated Apr. 21, 2017, 14 Pages.

*Primary Examiner* — Reza Nabi
(74) *Attorney, Agent, or Firm* — Shook, Hardy & Bacon L.L.P.

(57) ABSTRACT

Aspects of the technology described herein can detect visual regressions in a computer-generated document, such as a web page, caused by programming errors. The technology can be used to detect errors in programs coded in a variety of different languages and used in a variety of applications that generate user interfaces. In one aspect, the technology is used to validate an updated program module prior to replacing a production version of the program module with the updated version. The technology described herein can compare a baseline version of a user interface with a test version of the user interface generated using the updated program module. In an aspect, a visual parity analysis is run to detect a visual regression.

18 Claims, 11 Drawing Sheets

(56) References Cited

U.S. PATENT DOCUMENTS

| | | | |
|---|---|---|---|
| 2013/0004087 A1* | 1/2013 | Kumar | G06K 9/6202 382/218 |
| 2013/0036402 A1* | 2/2013 | Mutisya | G06F 11/3688 717/124 |
| 2013/0263098 A1* | 10/2013 | Duda | G06F 11/3664 717/134 |
| 2014/0075344 A1* | 3/2014 | Bentrup | G06F 11/3664 715/760 |
| 2014/0181705 A1* | 6/2014 | Hey | G06F 11/3672 715/764 |
| 2014/0245069 A1* | 8/2014 | Hu | G06F 11/362 714/38.1 |
| 2014/0337674 A1* | 11/2014 | Ivancic | H04L 43/50 714/43 |
| 2015/0082280 A1* | 3/2015 | Betak | G06F 11/3692 717/124 |
| 2015/0089292 A1* | 3/2015 | Ueda | G06F 11/263 714/33 |
| 2015/0278079 A1* | 10/2015 | Cheng | G06F 9/45558 718/1 |
| 2016/0048438 A1* | 2/2016 | Martos | G06F 11/1469 714/33 |
| 2017/0155569 A1* | 6/2017 | Chinnaswamy | H04L 43/50 |
| 2017/0277374 A1* | 9/2017 | Ozcan | G06F 3/0484 |

\* cited by examiner

VISUAL REGRESSION ANALYSIS

BACKGROUND

Modern web pages can be generated by executing multiple program modules and functions in response to an almost limitless variety of user input and/or interactions. The appearance of a web page can change depending on the characteristics of the user device accessing the web page. For example, different user devices may have different form factors, resolution, and browser applications. A programmer or developer changing one line of code, function, or module may not be able to determine the impact on other portions of the code.

Almost a limitless number of variations can be created for an individual web page making quality control very difficult. For example, a table on a web page could be populated with data drawn from one or more knowledge bases in response to a query. Images and advertisements could be presented from other sources. A search engine might generate search results in multiple formats. In each case, a single error in the code can cause display abnormalities on the web page. For example, a margin could change, a color of text could change, a function could fail to execute, and such. Catching and fixing these errors before placing updated code into production remains a challenge.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein can detect visual regressions in a computer-generated document, such as a web page, caused by programming errors. The technology can be used to detect errors in programs coded in a variety of different languages and used in a variety of applications that generate user interfaces. In one aspect, the technology is used to validate an updated program module prior to replacing a production version of the program module with the updated version. As used herein, a program module can be a portion of computer code that forms a larger program or application.

The technology described herein can compare a baseline version of a user interface with a test version of the user interface generated using the updated program module. In an aspect, a visual parity analysis is run to detect a visual regression. A visual regression is a difference between the production version of a user interface and the test version of the user interface. Upon detecting a visual regression, an error message can be generated and the updated program module can be prevented from entering production if the visual regression is the result of a programming bug or error. Alternatively, if the visual regression is the result of programming that intentionally changes the appearance of the user interface then the updated programming module can be allowed to enter production.

BRIEF DESCRIPTION OF THE DRAWINGS

Aspects of the technology described in the present application are described in detail below with reference to the attached drawing figures, wherein.

DETAILED DESCRIPTION

Figure 1:
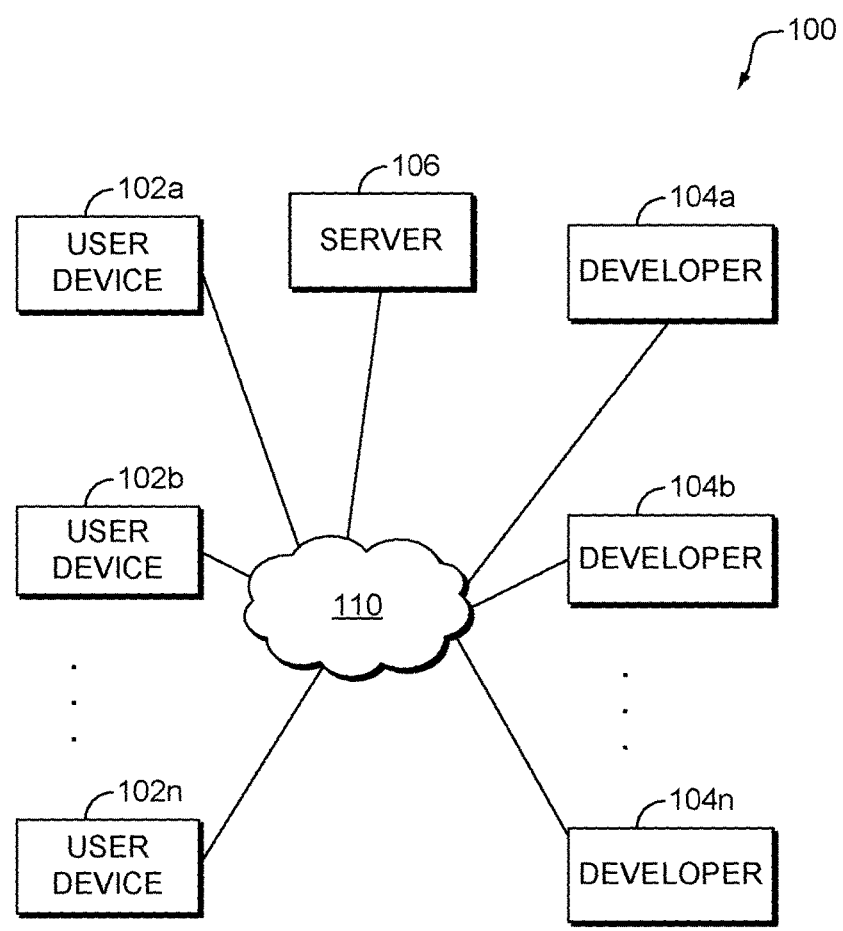
FIG. 1 is a block diagram of an exemplary computing environment suitable for implementing aspects of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein can detect visual regressions in a computer-generated document, such as a web page, caused by programming errors. The technology can be used to detect errors in programs coded in a variety of different languages and used in a variety of applications that generate user interfaces. In one aspect, the technology is used to validate an updated program module prior to replacing a production version of the program module with the updated version. As used herein, a program module can be a portion of computer code that forms a larger program or application.

The technology described herein can compare a baseline version of a user interface with a test version of the user interface generated using the updated program module. In an aspect, a visual parity analysis is run to detect a visual regression. A visual regression is a difference between the production version of a user interface and the test version of the user interface.

The technology described herein can use a plurality of test scenarios to generate test versions of the user interface. The test scenario can include simulated user interactions that can cause aspects of a user interface to function. For example, a user interaction could be clicking on a link, inputting text into a textbox, hovering over an aspect of the user interface, etc. An individual test scenario can be executed on a plurality of different virtual machines. Each virtual machine may simulate a particular hardware and software setup. For example, different smartphones can have different screen sizes and various virtual machines could simulate smartphones with a different form factor.

Aspects of the technology are scalable to allow a plurality of developers to access a test setup and run a visual parity analysis when updating program modules. Upon detecting a visual regression, an error message can be sent to the developer with an explanation of the error. In situations where the updated program module is intended to change an appearance of a user interface, then an override procedure may be used to check in the updated program module despite the error message. The test platform can maintain a library of test scenarios and set up virtual machines ready for developers to use. The library of scenarios eliminates the need for developers to set up their own scenario and can impose a quality control function on all updates to a program prior to putting the update into production if the visual regression is the result of a programming bug or error. Alternatively, if the visual regression is the result of programming that intentionally changes the appearance of the user interface then the updated programming module can enter production.

Having briefly described an overview of aspects of the technology described herein, an exemplary operating environment suitable for use in implementing the technology is described below.

Exemplary Operating Environment

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of developer work stations, such as developer work stations 104a and 104b through 104n; server 106; and network 110. It should be understood that environment 100 shown in FIG. 1 is an example of one suitable operating environment. Each of the components shown in FIG. 1 may be implemented via any type of computing device, such as computing device 1100 described in connection to FIG. 11, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be client devices on the client-side of operating environment 100, while server 106 can be on the server-side of operating environment 100. The user devices can access web pages generated by a media server. In one aspect, the browser application on the user devices accesses a search engine web page or other website hosted by the server 106.

Server 106 can comprise server-side software designed to work in conjunction with client-side software on user devices 102a and 102b through 102n so as to implement any combination of the features and functionalities discussed in the present disclosure. For example, the server 106 may receive a query, use the production search module to generate a search results page, and provide a search results page to a user. The visual parity technology described herein can operate on the server 106 or be used to validate updates to one or more applications running on the server 106. This division of operating environment 100 is provided to illustrate one example of a suitable environment, and there is no requirement for each implementation that any combination of server 106 and user devices 102a and 102b through 102n remain as separate entities. Several more detailed operating environments are provided in FIGS. 2-4.

User devices 102a and 102b through 102n may comprise any type of computing device capable of use by a user. For example, in one aspect, user devices 102a through 102n may be the type of computing device described in relation to FIG. 11 herein. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Developer work stations 104a and 104b through 104n may comprise computing devices, which are configured to write and update code. The work stations 104a and 104b through 104n may include special-purpose code editing software. The work stations 104a and 104b through 104n are shown connecting to the server 106 via network 110. In one aspect, the work stations can connect to the server through a local area network. In other words, the work stations 104a and 104b through 104n could be located in the same building or campus as the server 106. In one aspect, hundreds or thousands of developers can update code for applications running on the server 106.

Figure 2:
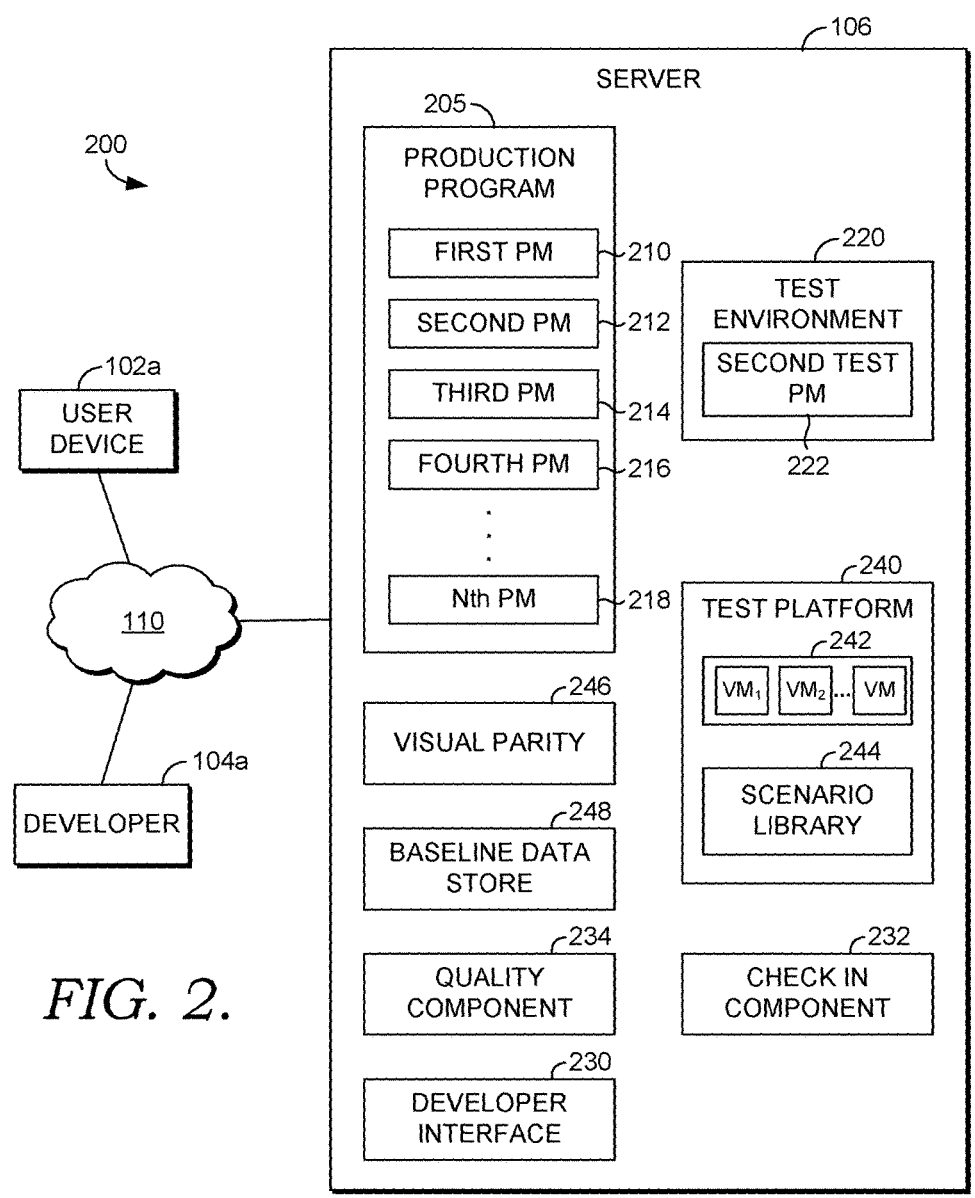
FIG. 2 is a diagram depicting an exemplary computing environment for detecting a visual regression, in accordance with an aspect of the technology described herein.

Operating environment 100 can be utilized to implement one or more of the components of the visual parity system, described in FIG. 2, including components for updating code, generating baseline production pages, generating test pages, and running a visual parity analysis on the production pages and test pages.

Referring now to FIG. 2, with FIG. 1, a block diagram is provided showing aspects of an example computing system architecture suitable for implementing an aspect of the technology described herein and designated generally as testing environment 200. Testing environment 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Turning now to FIG. 2, a testing environment 200 that detects visual regressions caused by an updated program module is shown, in accordance with an aspect of the technology described herein. The testing environment 200 includes a server 106. The server 106 can generate a user interface, such as a website, for a user. The server 106 may include multiple programs that generate user interfaces. The present test platform can be configured to work with multiple programs. The server 106 includes production program 205, test environment 220, test platform 240, check-in component 232, quality component 234, developer interface 230, baseline data store 248, and visual parity component 246.

The developer interface 230 can receive updated program modules from a developer, such as the developer using the developer workstation 104A. The developer interface 230 can also provide an interface through which a developer is able to establish test parameters, including the selection of a test scenario from the scenario library 244. In one aspect, all available test scenarios are run to test the visual parity of a visible user interface generated using an updated program module. In other aspects, a subset or even just a single scenario is selected from the scenario library 244 to test a particular updated program module. For example, if it is known that an updated program module only impacts a visible user interface as presented in a particular language, then scenarios that test according to the particular language, such as Chinese, Japanese, English, or German, can be selected. The developer interface 230 also allows the developer to provide information about the program module to be updated, scheduling information, and other relevant information such as contact information where an error message or validation message may be sent.

The check-in component 232 can act as a gateway that prevents updated programs from being checked in without testing. The check-in component 232 can include a series of heuristics that dictate test scenarios that need to be run for validation of a particular class of program module. Developer characteristics can be used to select a test scenario. For example, the seniority level of a developer may be considered when selecting test scenarios.

In one aspect, the check-in component 232 can prevent an updated program module from being checked-in when a visual regression is detected if the visual regression is the result of a programming bug or error. Alternatively, if the visual regression is the result of programming that intentionally changes the appearance of the user interface then the updated programming module can be allowed to enter production. In one aspect, a user submitting a module for testing can specify that a changed appearance of the user interface is anticipated. The user could then be presented a message detailing the visual regression and asked to confirm the changes are intentional. In another aspect, when the visual regression is intentional, then an additional approval method for checking in the code is initiated. For example, the check-in component 232 may require authorization from a supervisor to check-in code causing changed appearance, in contrast to code that does not change the interface's appearance which may not require the additional authorization.

The quality component 234 can track all visual parity tests that are run as well as the result of the test. The quality component 234 can generate reports and records of the tests, including reports by developer, program module, vendor, or other criteria. Over time, the testing data can be used to determine which modules are most likely to cause problems. This information can be used as feedback to select more vigorous testing for program modules that more frequently cause visual regressions.

The production program 205 receives input from users, such as the user of user device 102A, and generates a user interface, such as a website. The production program 205 comprises a plurality of program modules. Each program module that is within the production program 205 may be described as a production version of the program module. The program modules shown include a first program module 210, a second program module 212, a third program module 214, a fourth program module 216, and an Nth program module 218. The inclusion of the Nth program module 218 indicates that aspects of the technology described herein are not limited to a particular number of program modules. The program modules can communicate with each other and otherwise work together to process user input and generate a user interface.

The test environment 220 isolates an updated version of a program module for the purpose of testing. In this case, an updated version of the second program module 222 is shown within the test environment 220. When a test is executed by the test platform 240, the production program functions as it otherwise would except that functions that would normally be performed by the production version of the second program module 212 are instead performed by the test version of the second program module 222. In this way, users or developers are able to test their updated program module with the current production version of the program to accurately assess the impact of updating a program module.

The test platform 240 creates a simulated user environment to perform the testing and validation. The test platform 240 includes a plurality of virtual machines 242. The plurality of virtual machines include machines set up to mimic the user device characteristics of relevant user devices to be tested. The virtual machines can be set up on a variety of different operating systems, browsers, form factors, hardware profiles, and other characteristics. Each virtual machine can execute a test scenario. The test scenario can simulate user interactions with the program to generate one or more user interfaces. Screenshots of the user interface can be captured at different points during the test scenario and eventually compared with baseline screenshots taken at a corresponding point in the scenario.

The scenario library 244 includes a plurality of scenarios for testing. As mentioned, each scenario can include instructions that simulate user interactions with the production program. For example, a test scenario could include instructions that generate a mouse over, a hover, text input, a selection of a component, and other interactions. Each scenario can include instructions for loading or executing the test through a plurality of different virtual machines. Multiple scenarios may be executed to test an individual updated program module. Upon generating a test user interface, a screenshot can be generated by the test platform and communicated to the visual parity component 246.

The visual parity component 246 runs a visual parity analysis that compares a screenshot of a test version of the user interface with a baseline version of the user interface. The baseline version can be generated by running the scenario through a production version of the program. For example, a baseline scenario, including the production version of the second program module, could be run to generate a production version of the user interface (UI), which is then converted to a screenshot of the UI. The visual parity component 246 can compare a test screenshot with a baseline screenshot on a pixel-by-pixel basis and note any differences.

In one aspect, the visual parity component 246 compares a test screenshot with the baseline screenshot for the same test scenario on pixel-by-pixel basis. Before performing the comparison, in order to free the comparison of any noise caused by device settings, contrast settings etc., various image noise reduction filters can be applied to both the test screenshot and the baseline screenshot. After this, the images are then compared for a visual parity (if any). Various configurations that can be applied to the comparison algorithm like identify if two images are related/similar/reflect the same testing scenario, optimize on ignoring the white space, only compare content, and such.

The baseline data store 248 can include a plurality of baseline screenshots that correspond with the results expected by running the various scenarios in the scenario library. As the production program is updated, especially with updates that are intended to change the appearance of a visible user interface, the test platform 240 can run all of the scenarios against the production program to generate a new plurality of baseline screenshots that replace the previous version of baseline screenshots.

Figure 3:
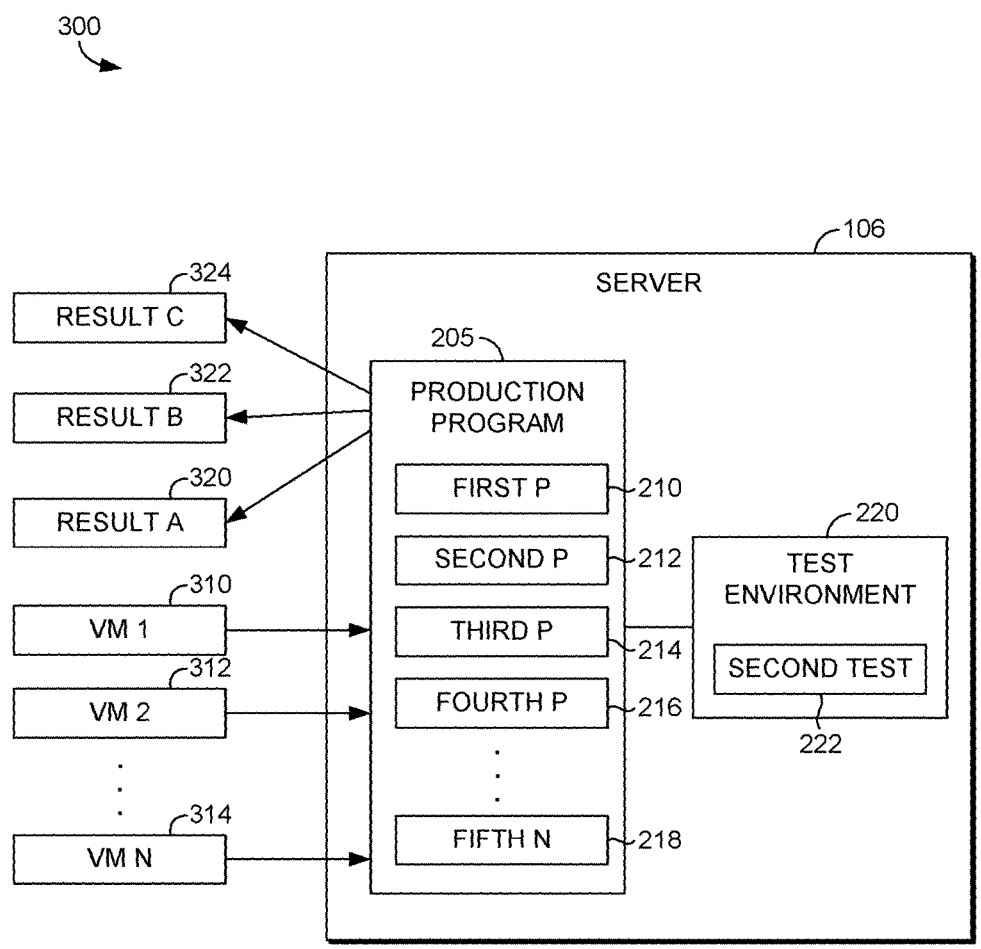
FIG. 3 is a diagram depicting a computing environment for generating a test web page, in accordance with an aspect of the technology described herein.

Turning now to FIG. 3, the execution of test scenarios within the test environment 300 are illustrated, according to an aspect of the technology described herein. As mentioned previously, a test scenario can be executed to generate a test version of a website or other UI for analysis for visual parity with a baseline version of the UI. FIG. 3 shows a first virtual machine 310, a second virtual machine 312, and an Nth virtual machine 314. Each virtual machine sends one or more simulated user instructions to the production program 205. The production program generates a website or other UI in response to those simulated instructions. The executions occurring on the production program 205 utilize the test version of the second program module 222 instead of the production version of the second program module 212. Each virtual machine can receive a UI that can be converted into a screenshot for analysis. Each machine can generate screenshots of the UI at different points during the test. The collection of screenshots from a test can be described as a result set. The result sets include a result set A 320, a result set B 322, and a result set C 324. Each result set can include a single screenshot or a group of screenshots that are captured during the scenario. For example, a scenario could capture a first screenshot when a home page is opened, a second screenshot as text is entered into a textbox, and a third screenshot as the user hovers over a portion of the web page or user interface. Each screenshot within the result set could be compared with a baseline screenshot taken at the same point during the test scenario.

Figure 4:
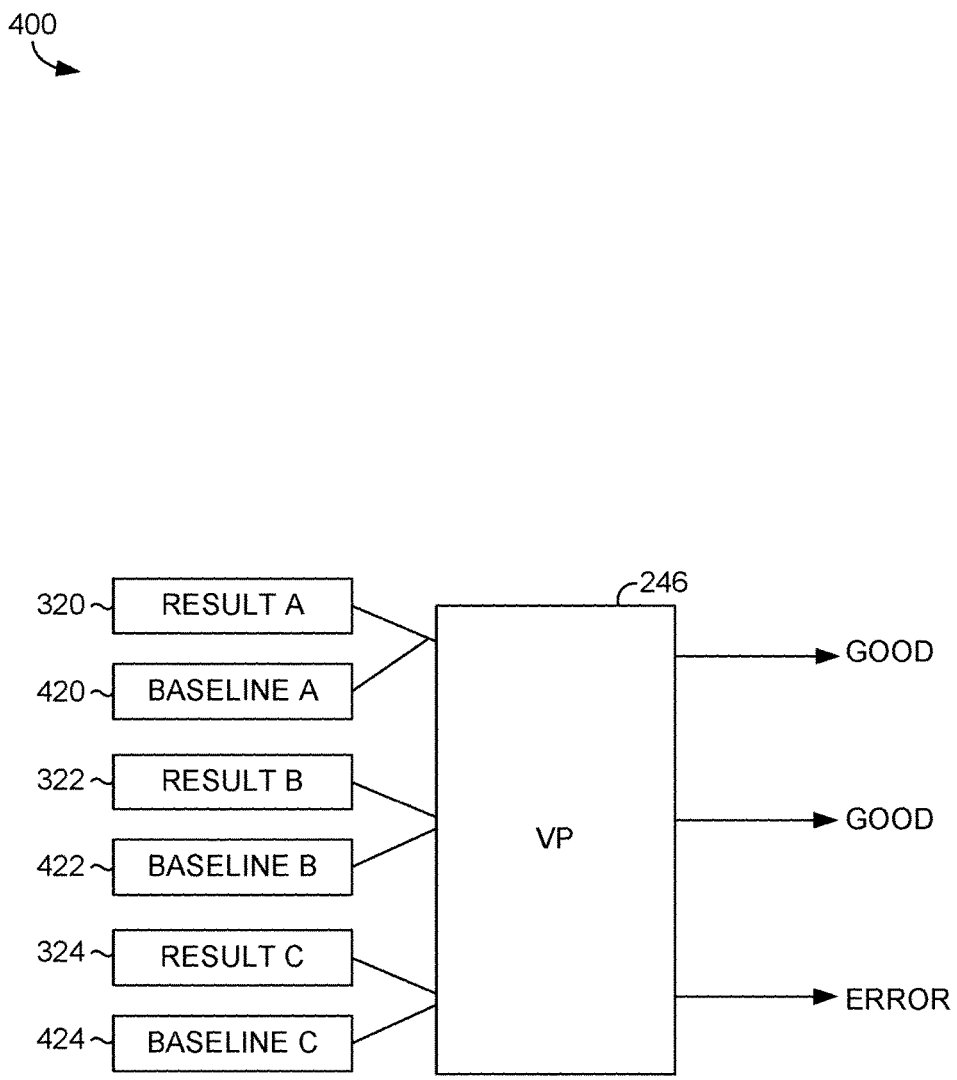
FIG. 4 is a diagram depicting a computing environment for comparing the visual parity of a production baseline page with a test page, in accordance with an aspect of the technology described herein.

Turning now to FIG. 4, a visual parity analysis is illustrated, according to an aspect of the technology described herein. FIG. 4 illustrates three different visual parity analyses. The input to the first visual parity analysis includes the result set A 320 and baseline website result set A 420. The baseline result set can be generated by running the test scenario that generated result set A 320 through the production program 205 without using any updated production modules. The input to the second visual parity analysis is the result set B 322 and the baseline result set B 422. The third visual parity analysis is conducted using the result set C 324 and the baseline result set C 424.

The result of the first analysis using the result set A 320 is good visual parity. The second result is also good visual parity, while the third result includes a visual regression causing an error. It should be noted that the A, B, and C result sets could all be generated from different scenarios testing the updated second program module 222. Different test scenarios testing the same updated program module may not generate a visual regression, while others do generate a visual regression.

Figure 5:
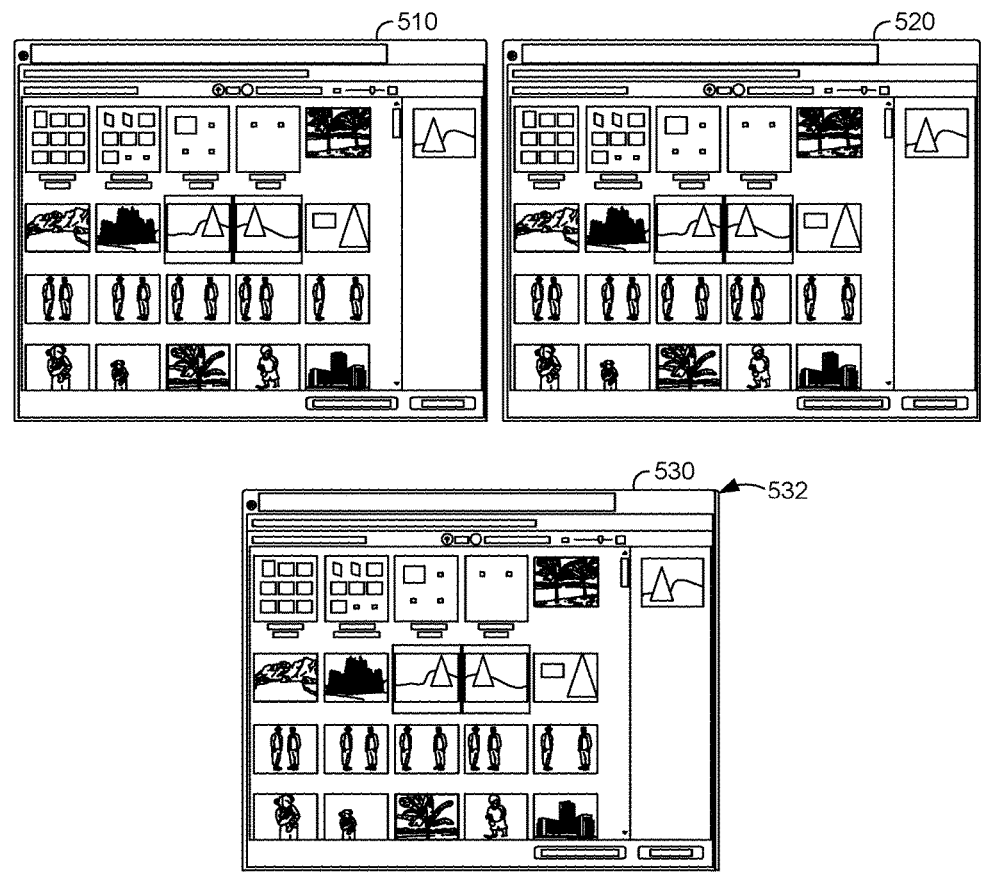
FIG. 5 is a diagram depicting a visual regression caused by a change in page width, in accordance with an aspect of the technology described herein.

Turning now to FIG. 5, a hypothetical visual parity analysis is illustrated. FIG. 5 includes a baseline screenshot 510, a test version screenshot 520, and a composite 530. As can be seen, the composite 530 indicates a margin differentiation 532. In other words, the baseline screenshot 510 is not the same width as the test version screenshot 520. The difference could be as little as a single pixel wide, which would be difficult to discern with the human eye, but could be readily identified using a visual parity analysis. In one aspect, when an error is generated, a visual indication of the analysis is provided in the form of the composite.

Figure 6:
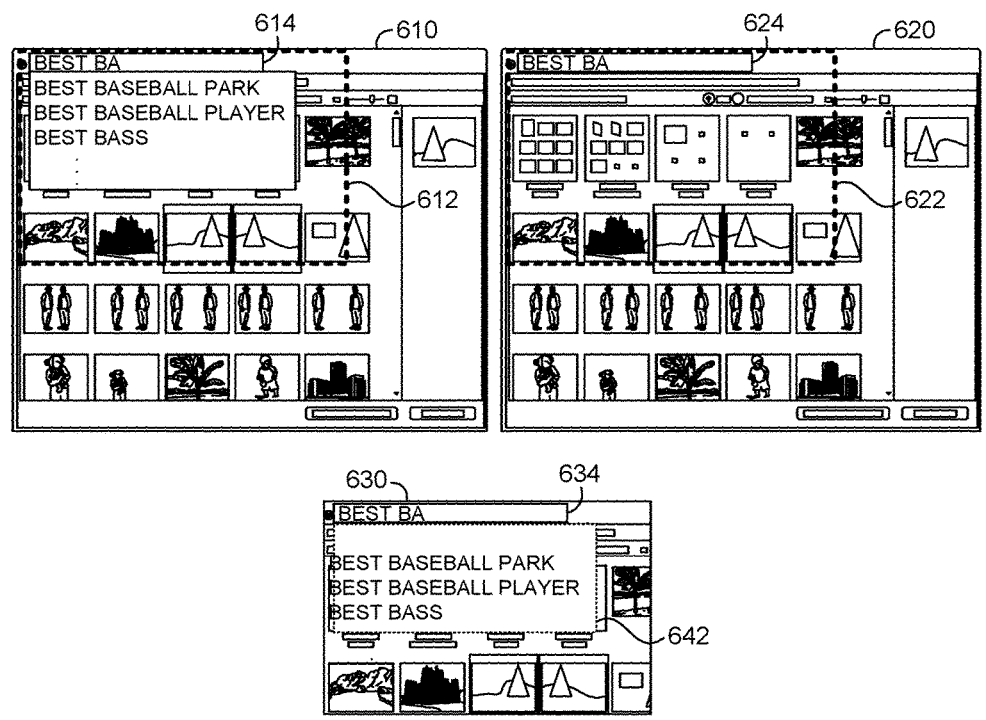
FIG. 6 is a diagram depicting a visual regression in a region of a page caused by a program failing to execute, in accordance with an aspect of the technology described herein.

Turning now to FIG. 6, a visual regression caused by the failure of an autocomplete feature to function correctly is illustrated. FIG. 6 includes a baseline screenshot 610, a test version screenshot 620, and a composite 630 highlighting the visual regression. In this case, only a portion or region of each screenshot is analyzed. Box 612 and box 622 illustrate the region selected for analysis. The baseline screenshot 610 includes a textbox 614 and auto suggestions. As can be seen, the test version screenshot 620 includes the textbox 624 but not the autocomplete suggestions. The text "best ba" is an example of a simulated user interaction that can be provided via a virtual machine as part of a test scenario. The autocomplete feature 642 in the composite 630 is visually highlighted to emphasize its omission from the test screenshot 620.

Figure 7:
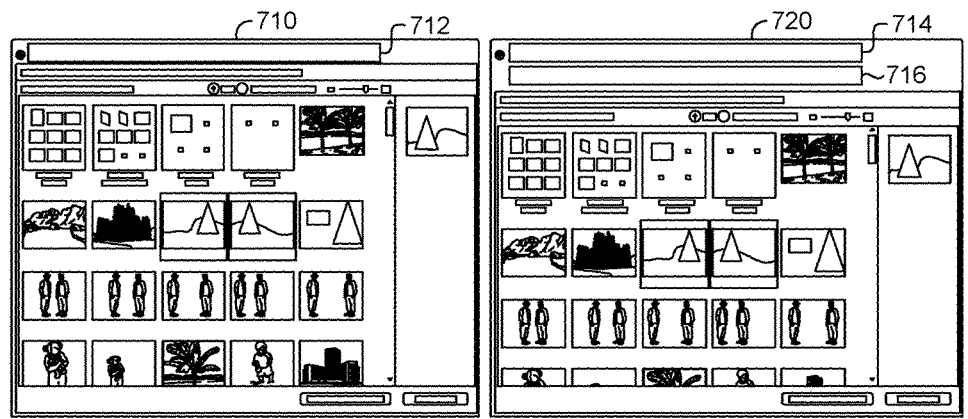
FIG. 7 is a diagram depicting a visual regression caused by duplicating a search box, in accordance with an aspect of the technology described herein.

Turning now to FIG. 7, another example of a visual regression is provided. FIG. 7 includes baseline screenshot 710 and a test version screenshot 720. As can be seen, the baseline screenshot 710 includes a single text entry box 712, while the test version 720 includes two textboxes 714 and 716. The addition of a second textbox is a visual regression that could be detected through the visual parity analysis.

Figure 8:
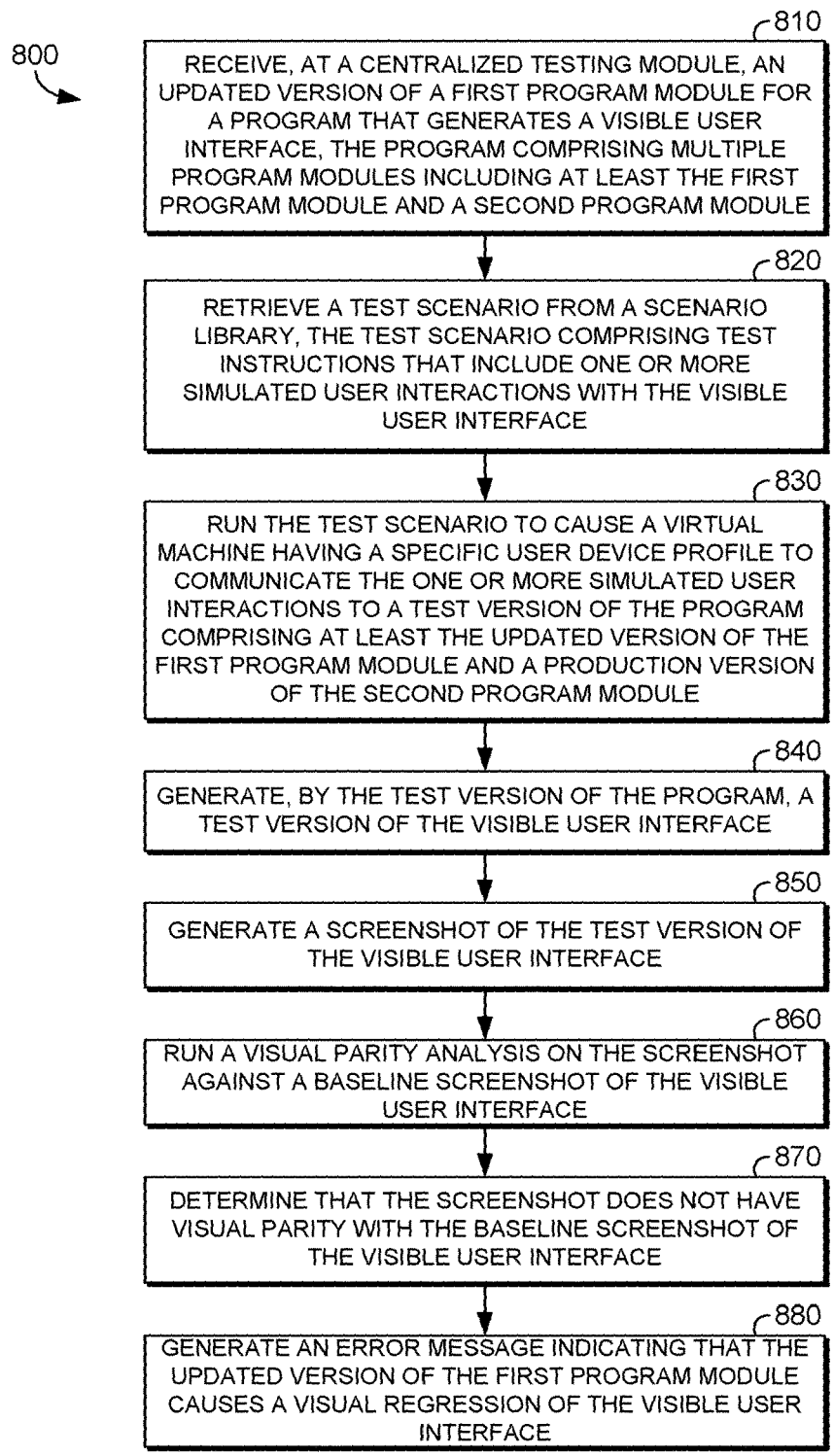
FIG. 8 is a diagram depicting a method of detecting a visual regression caused by an updated program module, in accordance with an aspect of the technology described herein.

Turning now to FIG. 8, a method 800 of detecting a visual regression caused by an updated program module is provided, according to an aspect of the technology described here. In an aspect, the method 800 is performed by a computing environment similar to testing environment 200, described previously.

At step 810, an updated version of a first program module is received for a program that generates a visible user interface. The program comprises multiple program modules including at least the first program module and a second program module. The updated version can be received by a centralized testing system. The centralized testing system can be a service offered by a data center to help developers test program updates. Because the testing system looks for visual regression, it is agnostic to the code language or application being tested.

At step 820, a test scenario is retrieved from a scenario library. The test scenario comprises test instructions that include one or more simulated user interactions with the visible user interface. In one aspect, a developer can select the test scenario. In another aspect, multiple test scenarios are selected to test the updated program module.

At step 830, the test scenario is run to cause a virtual machine having a specific user device profile to communicate the one or more simulated user interactions to a test version of the program comprising at least the updated version of the first program module and a production version of the second program module.

At step 840, the test version of the program generates a test version of the visible user interface. The test version of the program includes at least the updated version of the first program module in combination with production versions of program modules. Production versions of program modules have been tested and are currently being used to generate output for users of the program.

At step 850, a screenshot of the test version of the visible user interface is generated. The screenshot can be generated in any one of many available image formats, such as bitmap, JPEG, and such.

At step 860, a visual parity analysis is run on the screenshot against a baseline screenshot of the visible user interface. The visual parity analysis can compare the baseline screenshot with the screenshot generated from the test user interface on a pixel-by-pixel basis to determine differences. Before performing the comparison, in order to free the comparison of any noise caused by device settings, contrast settings etc., various image noise reduction filters can be applied to both the test screenshot and the baseline screenshot. After this, the images are then compared for a visual parity (if any). Various configurations that can be applied to the comparison algorithm like identify if two images are related/similar/reflect the same testing scenario, optimize on ignoring the white space, only compare content, and such.

At step 870, the screenshot is determined to not have visual parity with the baseline screenshot of the visible user interface. The two screenshots do not have visual parity when a visual difference exists between the two screenshots. A difference as small as a single pixel having a different color could trigger a determination that the two screenshots lack visual parity. The visual parity analysis can analyze the entire screenshot or a particular region of the screenshot. Analyzing just a region of the screenshot can reduce the load on a machine performing the analysis.

At step 880, an error message is generated indicating that the updated version of the first program module causes a visual regression of the visible user interface. The error message can be communicated to a developer who submitted the updated version of the first program module. The error message could also be communicated to an administrator or other entity responsible for managing the production version of the program. The result of the visual parity analysis can be explained in the error message. In one aspect, a composite of the baseline screenshot and test version of the screenshot is shown highlighting the visual regression. For example, the visual regression could be shown in red or some other color that distinguishes it from the baseline user interface. The result of the visual parity analysis can also be recorded for future analysis. For example, developers who submit updated program modules that frequently cause visual regression could be identified.

Upon detecting a visual regression, an error message can be generated and the updated program module can be prevented from entering production if the visual regression is the result of a programming bug or error. Alternatively, if the visual regression is the result of programming that intentionally changes the appearance of the user interface then the updated programming module can be allowed to enter production. In one aspect, additional approvals are sought to check-in code causing visual regressions.

Figure 9:
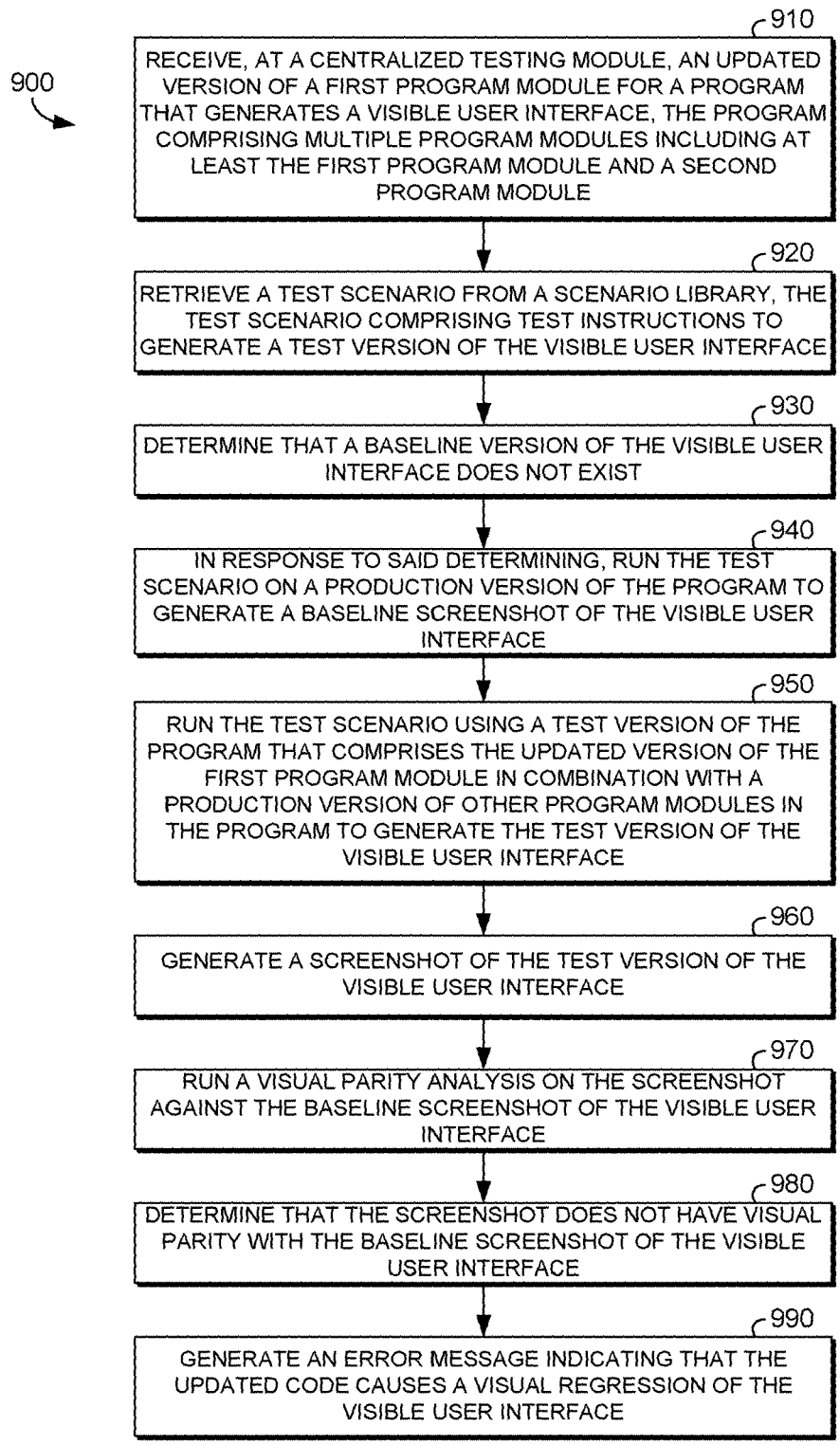
FIG. 9 is a diagram depicting a method of detecting a visual regression caused by updated code, in accordance with an aspect of the technology described herein.

Turning now to FIG. 9, a method 900 of detecting a visual regression caused by updated code is provided, according to an aspect of the technology described herein. In an aspect, the method 900 is performed by a computing environment similar to testing environment 200, described previously.

At step 910, an updated version of a first program module for a program that generates a visible user interface is received at a centralized testing module. The program comprises multiple program modules including at least the first program module and a second program module. The program modules work together to perform the function of the program.

At step 920, a test scenario is retrieved from a scenario library. The test scenario comprises test instructions to generate a test version of the visible user interface. In one aspect, a developer can select the test scenario. In another aspect, multiple test scenarios are selected to test the updated program module.

At step 930, a determination is made that a baseline version of the visible user interface does not exist. The determination can be made by accessing a baseline data store. Each baseline may be associated with metadata identifying a test scenario and a version of the production program. A matching baseline screenshot would designate the current version of the production program and the selected test scenario.

At step 940, in response to said determining at step 930, the test scenario is run on a production version of the program to generate a baseline screenshot of the visible user interface. The production version of the program includes only program modules that have been tested and are actively being used to generate user interfaces for users of the program. The screenshot can be generated in any one of many available image formats, such as bitmap, JPEG, and such.

At step 950, the test scenario is run using a test version of the program that comprises the updated version of the first program module in combination with a production version of other program modules in the program to generate the test version of the visible user interface. The test version of the program includes at least the updated version of the first program module in combination with production versions of program modules. Production versions of program modules have been tested and are currently being used to generate output for users of the program. A single program module can be tested using multiple test scenarios.

At step 960, a screenshot of the test version of the visible user interface is generated. The screenshot can be generated in any one of many available image formats, such as bitmap, JPEG, and such.

At step 970, a visual parity analysis is run on the screenshot against the baseline screenshot of the visible user interface. The visual parity analysis can compare the baseline screenshot with the screenshot generated from the test user interface on a pixel-by-pixel basis to determine differences. Before performing the comparison, in order to free the comparison of any noise caused by device settings, contrast settings etc., various image noise reduction filters can be applied to both the test screenshot and the baseline screenshot. After this, the images are then compared for a visual parity (if any). Various configurations that can be applied to the comparison algorithm like identify if two images are related/similar/reflect the same testing scenario, optimize on ignoring the white space, only compare content, and such.

At step 980, the screenshot is determined to not have visual parity with the baseline screenshot of the visible user interface. The two screenshots do not have visual parity when a visual difference exists between the two screenshots. A difference as small as a single pixel having a different color could trigger a determination that the two screenshots lack visual parity. The visual parity analysis can analyze the entire screenshot or a particular region of the screenshot. Analyzing just a region of the screenshot can reduce the load on a machine performing the analysis.

At step 990, an error message is generated indicating that the partial code update causes a visual regression of the visible user interface. The error message can be communicated to a developer who submitted the updated version of the first program module. The error message could also be communicated to an administrator or other entity responsible for managing the production version of the program. The result of the visual parity analysis can be explained in the error message. In one aspect, a composite of the baseline screenshot and test version of the screenshot is shown highlighting the visual regression. For example, the visual regression could be shown in red or some other color that distinguishes it from the baseline user interface. The result of the visual parity analysis can also be recorded for future analysis. For example, developers who submit updated program modules that frequently cause visual regression could be identified.

Upon detecting a visual regression, an error message can be generated and the updated program module can be prevented from entering production if the visual regression is the result of a programming bug or error. Alternatively, if the visual regression is the result of programming that intentionally changes the appearance of the user interface then the updated programming module can be allowed to enter production. In one aspect, additional approvals are sought to check-in code causing visual regressions.

Figure 10:
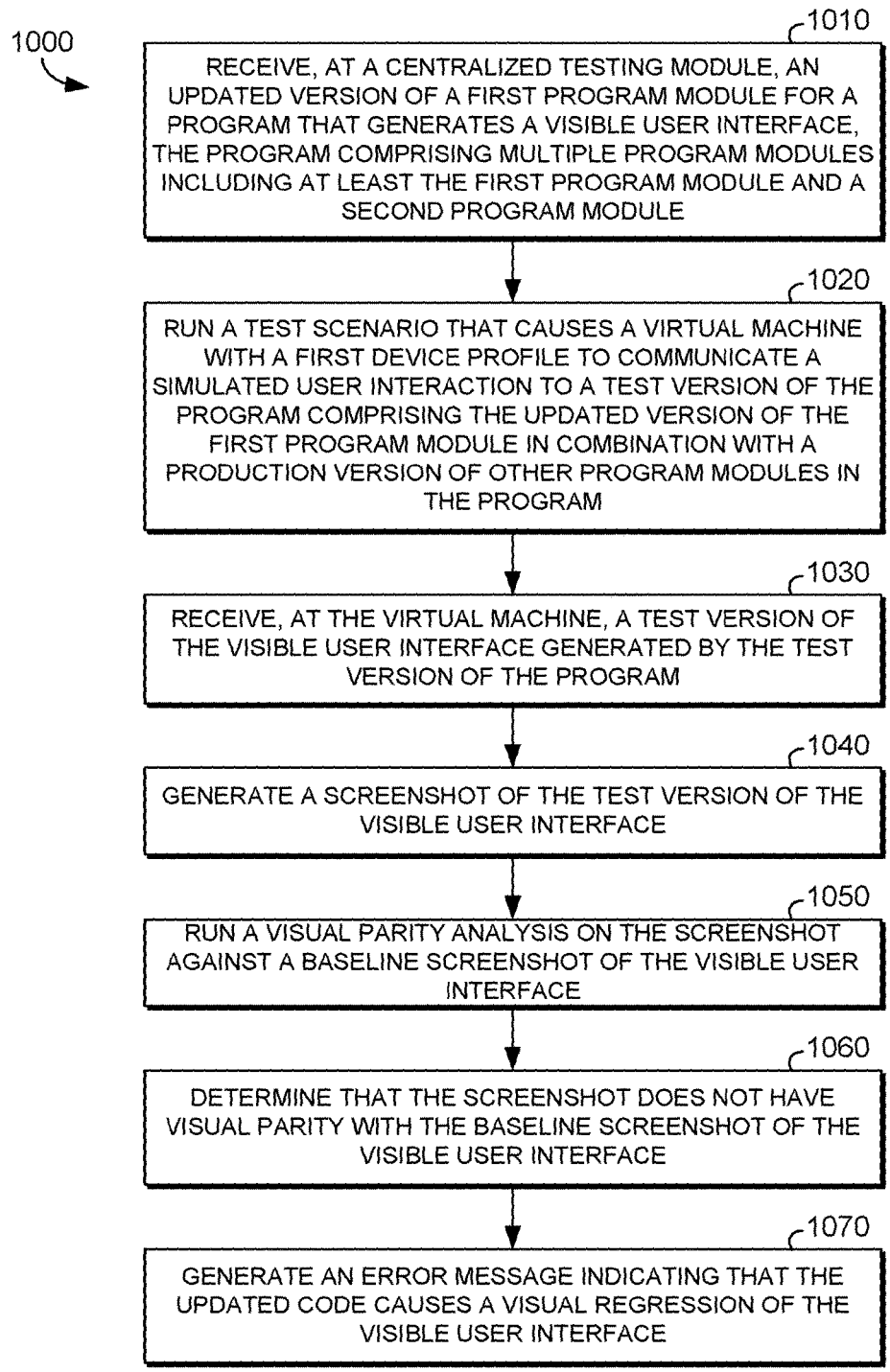
FIG. 10 is a diagram depicting a method of detecting a visual regression caused by updated code, in accordance with an aspect of the technology described herein.

Turning now to FIG. 10, a method 1000 of detecting a visual regression caused by updated code is provided. In an aspect, the method 1000 is performed in a computing environment similar to testing environment 200, described previously.

At step 1010, an updated version of a first program module is received at a centralized testing module for a program that generates a visible user interface. The program comprises multiple program modules including at least the first program module and a second program module. The first program module can be submitted by a developer. In one aspect, a developer submits the first program module to a quality control apparatus that automatically schedules a test of the first program module to determine whether the first program module generates a visual regression.

At step 1020, a test scenario is run that causes a virtual machine with a first device profile to communicate a simulated user interaction to a test version of the program comprising the updated version of the first program module in combination with a production version of other program modules in the program. The virtual machine simulates a user accessing the program to perform one or more tasks. Each virtual machine can be set up to mimic a particular user device. In aspects, a single test scenario can be run using multiple virtual machines. A single program module can be tested using multiple test scenarios.

At step 1030, a test version of the visible user interface generated by the test version of the program is received at the virtual machine. The test version of the program includes at least the updated version of the first program module in combination with production versions of program modules. Production versions of program modules have been tested and are currently being used to generate output for users of the program.

At step 1040, a screenshot of the test version of the visible user interface is generated. The screenshot can be generated in any one of many available image formats, such as bitmap, JPEG, and such.

At step 1050, a visual parity analysis is run on the screenshot against a baseline screenshot of the visible user interface. The visual parity analysis can compare the baseline screenshot with the screenshot generated from the test user interface on a pixel-by-pixel basis to determine differences. Before performing the comparison, in order to free the comparison of any noise caused by device settings, contrast settings etc., various image noise reduction filters can be applied to both the test screenshot and the baseline screenshot. After this, the images are then compared for a visual parity (if any). Various configurations that can be applied to the comparison algorithm like identify if two images are related/similar/reflect the same testing scenario, optimize on ignoring the white space, only compare content, and such.

At step 1060, the screenshot is determined to not have visual parity with the baseline screenshot of the visible user interface. The two screenshots do not have visual parity when a visual difference exists between the two screenshots. A difference as small as a single pixel having a different color could trigger a determination that the two screenshots lack visual parity. The visual parity analysis can analyze the entire screenshot or a particular region of the screenshot. Analyzing just a region of the screenshot can reduce the load on a machine performing the analysis.

At step 1070, an error message is generated indicating that the partial code update causes a visual regression of the visible user interface. The error message can be communicated to a developer who submitted the updated version of the first program module. The error message could also be communicated to an administrator or other entity responsible for managing the production version of the program. The result of the visual parity analysis can be explained in the error message. In one aspect, a composite of the baseline screenshot and test version of the screenshot is shown highlighting the visual regression. For example, the visual regression could be shown in red or some other color that distinguishes it from the baseline user interface. The result of the visual parity analysis can also be recorded for future analysis. For example, developers who submit updated program modules that frequently cause visual regression could be identified.

Upon detecting a visual regression, an error message can be generated and the updated program module can be prevented from entering production if the visual regression is the result of a programming bug or error. Alternatively, if the visual regression is the result of programming that intentionally changes the appearance of the user interface then the updated programming module can be allowed to enter production. In one aspect, additional approvals are sought to check-in code causing visual regressions.

Exemplary Computing Environment

Figure 11:
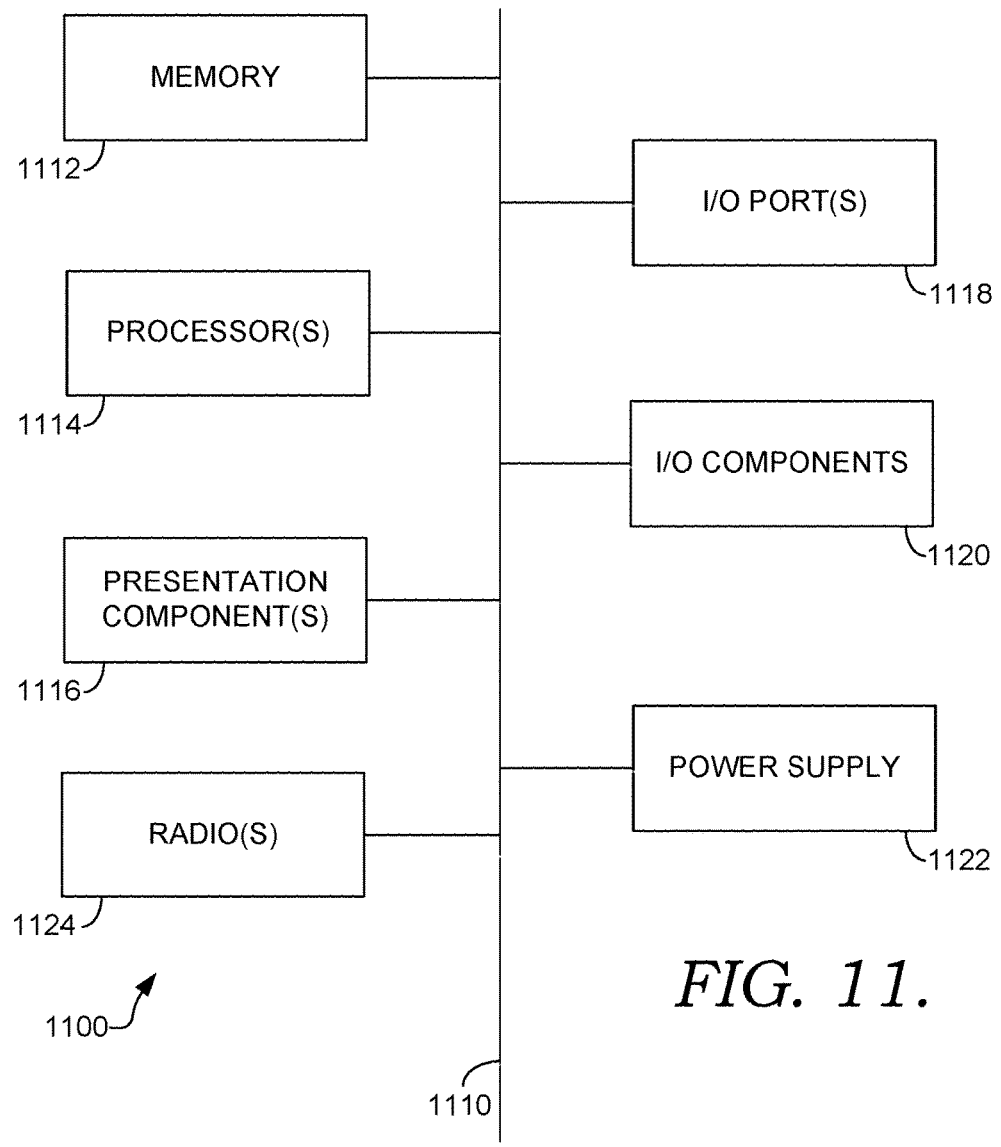
FIG. 11 is a block diagram of an exemplary computing environment suitable for implementing aspects of the technology described herein.

Referring to the drawings in general, and initially to FIG. 11 in particular, an exemplary operating environment for implementing aspects of the technology described herein is shown and designated generally as computing device 1100. Computing device 1100 is but one example of a suitable computing environment and is not intended to suggest any limitation as to the scope of use of the technology described herein. Neither should the computing device 1100 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 11, computing device 1100 includes a bus 1110 that directly or indirectly couples the following devices: memory 1112, one or more processors 1114, one or more presentation components 1116, input/output (I/O) ports 1118, I/O components 1120, and an illustrative power supply 1122. Bus 1110 represents what may be one or more busses (such as an address bus, data bus, or a combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 11 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 11 and refer to "computer" or "computing device." The computing device 1100 may be a PC, a tablet, a smartphone, virtual reality headwear, augmented reality headwear, a game console, and such.

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1112 includes computer storage media in the form of volatile and/or nonvolatile memory. The memory 1112 may be removable, non-removable, or a combination thereof. Exemplary memory includes solid-state memory, hard drives, optical-disc drives, etc. Computing device 1100 includes one or more processors 1114 that read data from various entities such as bus 1110, memory 1112, or I/O components 1120. Presentation component(s) 1116 present data indications to a user or other device. Exemplary presentation components 1116 include a display device, speaker, printing component, vibrating component, etc. I/O ports 1118 allow computing device 1100 to be logically coupled to other devices, including I/O components 1120, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1114 may be direct or via a coupling utilizing a serial port, parallel port, and/or other interface and/or system bus known in the art. Furthermore, the digitizer input component may be a component separate from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 1100. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as stereoscopic camera systems, infrared camera systems, RGB camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

The computing device 1100 may include a radio 1124. The radio transmits and receives radio communications. The computing device 1100 may be a wireless terminal adapted to receive communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth® connection to another computing device is a second example of a short-range connection. A long-range connection may include a connection using one or more of CDMA, GPRS, GSM, TDMA, and 802.16 protocols.

EMBODIMENTS SECTION

Embodiment 1. A computing system comprising: at least one processor; and memory having computer-executable instructions stored thereon that, when executed by the at least one processor, configure the computing system to: receive, at a centralized testing module, an updated version of a first program module for a program that generates a visible user interface, the program comprising multiple program modules including at least the first program module and a second program module; retrieve a test scenario from a scenario library, the test scenario comprising test instructions that include one or more simulated user interactions with the visible user interface; run the test scenario to cause a virtual machine having a specific user device profile to communicate the one or more simulated user interactions to a test version of the program comprising at least the updated version of the first program module and a production version of the second program module; generate, by the test version of the program, a test version of the visible user interface; generate a screenshot of the test version of the visible user interface; run a visual parity analysis on the screenshot against a baseline screenshot of the visible user interface; determine that the screenshot does not have visual parity with the baseline screenshot of the visible user interface; and generate an error message indicating that the updated version of the first program module causes a visual regression of the visible user interface.

Embodiment 2. The computing system of embodiment 1, wherein the computing system is further configured to: prevent the updated version of the first program module from being checked in to a production version of the program.

Embodiment 3. The computing system of any one of the above embodiments, wherein the baseline screenshot of the visible user interface is specific to the specific user device profile.

Embodiment 4. The computing system of any one of the above embodiments, wherein the specific user device profile comprises a specific browser.

Embodiment 5. The computing system of any one of the above embodiments, wherein the test scenario includes test instructions for a plurality of virtual machines with different user device profiles.

Embodiment 6. The computing system of any one of the above embodiments, wherein the visual parity analysis compares only a portion of the screenshot to a portion of the baseline screenshot.

Embodiment 7. The computing system of claim 1, wherein the computing system is further configured to generate the baseline screenshot by running the test scenario through a production version of the program.

Embodiment 8. The computing system of any one of the above embodiments, wherein the visible user interface is a search results page.

Embodiment 9. A method of detecting a visual regression caused by updated code comprising: receiving, at a centralized testing module, an updated version of a first program module for a program that generates a visible user interface, the program comprising multiple program modules including at least the first program module and a second program module; retrieving a test scenario from a scenario library, the test scenario comprising test instructions to generate a test version of the visible user interface; determining that a baseline version of the visible user interface does not exist; in response to said determining, run the test scenario on a production version of the program to generate a baseline screenshot of the visible user interface; running the test scenario using a test version of the program that comprises the updated version of the first program module in combination with a production version of other program modules in the program to generate the test version of the visible user interface; generating a screenshot of the test version of the visible user interface; running a visual parity analysis on the screenshot against the baseline screenshot of the visible user interface; determining that the screenshot does not have visual parity with the baseline screenshot of the visible user interface; and generating an error message indicating that the updated version of the first program module causes a visual regression of the visible user interface.

Embodiment 10. The method of embodiment 9, wherein the test scenario comprises simulated user interactions that can cause one or more interface features of the visible user interface to activate.

Embodiment 11. The method of embodiment 10, wherein simulated user interaction is entering text into a search box.

Embodiment 12. The method of any one of embodiment 8, 9, 10, or 11, wherein the production version of the program includes a production version of the first program module, not the updated version of the first program module.

Embodiment 13. The method of any one of embodiment 8, 9, 10, 11, or 12, wherein the visible user interface is a search results page.

Embodiment 14. The method of any one of embodiment 8, 9, 10, 11, 12, or 13, wherein the method further comprises storing the baseline screenshot in a baseline data store.

Embodiment 15. The method of any one of embodiment 8, 9, 10, 11, 12, 13, or 14, wherein the baseline screenshot is specific to a particular device profile.

Embodiment 16. One or more computer storage media having computer-executable instructions embodied thereon that, when executed, configure a computing device to perform a method of detecting a visual regression caused by updated code, the method comprising: receiving, at a centralized testing module, an updated version of a first program module for a program that generates a visible user interface, the program comprising multiple program modules including at least the first program module and a second program module; running a test scenario that causes a virtual machine with a first device profile to communicate a simulated user interaction to a test version of the program comprising the updated version of the first program module in combination with a production version of other program modules in the program; receiving, at the virtual machine, a test version of the visible user interface generated by the test version of the program; generating a screenshot of the test version of the visible user interface; running a visual parity analysis on the screenshot against a baseline screenshot of the visible user interface; determining that the screenshot does not have visual parity with the baseline screenshot of the visible user interface; and generating an error message indicating that the updated version of the first program module causes a visual regression of the visible user interface.

Embodiment 17. The media of embodiment 16, wherein the production version of the program includes a production version of the first program module, not the updated version of the first program module.

Embodiment 18. The media of any one of embodiment 16 or 17, wherein the method further comprises generating the baseline screenshot by running the test scenario through the production version of the program.

Embodiment 19. The media of any one of embodiment 16, 17, or 18, wherein the program is a search engine.

Embodiment 20. The media of any one of embodiment 16, 17, 18, or 19, wherein the baseline screenshot is specific to a particular device profile.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A computing system comprising: at least one processor; and
    memory having computer-executable instructions stored thereon that, when executed by the at least one processor, configure the computing system to:
    receive, at a centralized testing module, an updated version of a first program module for a program that generates a visible user interface, the program comprising multiple program modules including at least the first program module and a second program module;
    retrieve a test scenario from a scenario library, the test scenario comprising test instructions that include one or more simulated user interactions with the visible user interface;
    run the test scenario to cause a virtual machine having a specific user device profile to communicate the one or more simulated user interactions to a test version of the program comprising at least the updated version of the first program module and a production version of the second program module;
    generate, by the test version of the program, a test version of the visible user interface;
    generate a screenshot of the test version of the visible user interface;
    run a visual parity analysis on the screenshot against a baseline screenshot of the visible user interface;
    determine that the screenshot does not have visual parity with the baseline screenshot of the visible user interface; and
    generate an error message indicating that the updated version of the first program module causes a visual regression of the visible user interface,
    wherein the test scenario includes test instructions for a plurality of virtual machines with different user device profiles, wherein the visual parity analysis compares only a portion of the screenshot to a portion of the baseline screenshot.

2. The computing system of claim 1, wherein the computing system is further configured to: prevent the updated version of the first program module from being checked in to a production version of the program.

3. The computing system of claim 1, wherein the baseline screenshot of the visible user interface is specific to the specific user device profile.

4. The computing system of claim 3, wherein the specific user device profile comprises a specific browser.

5. The computing system of claim 1, wherein the computing system is further configured to generate the baseline screenshot by running the test scenario through a production version of the program.

6. The computing system of claim 1, wherein the visible user interface is a search results page.

7. A method of detecting a visual regression caused by updated code comprising:
    receiving, at a centralized testing module, an updated version of a first program module for a program that generates a visible user interface, the program comprising multiple program modules including at least the first program module and a second program module;
    retrieving a test scenario from a scenario library, the test scenario comprising test instructions to generate a test version of the visible user interface;
    determining that a baseline version of the visible user interface does not exist;
    in response to said determining, run the test scenario on a production version of the program to generate a baseline screenshot of the visible user interface;
    running the test scenario using a test version of the program that comprises the updated version of the first program module in combination with a production version of other program modules in the program to generate the test version of the visible user interface;
    generating a screenshot of the test version of the visible user interface; running a visual parity analysis on the screenshot against the baseline screenshot of the visible user interface;
    determining that the screenshot does not have visual parity with the baseline screenshot of the visible user interface; and
    generating an error message indicating that the updated version of the first program module causes a visual regression of the visible user interface,
    wherein the test scenario includes test instructions for a plurality of virtual machines with different user device profiles, wherein the visual parity analysis compares only a portion of the screenshot to a portion of the baseline screenshot.

8. The method of claim 7, wherein the test scenario comprises simulated user interactions that can cause one or more interface features of the visible user interface to activate.

9. The method of claim 8, wherein simulated user interaction is entering text into a search box.

10. The method of claim 7, wherein the production version of the program includes a production version of the first program module, not the updated version of the first program module.

11. The method of claim 7, wherein the visible user interface is a search results page.

12. The method of claim 7, wherein the method further comprises storing the baseline screenshot in a baseline data store.

13. The method of claim 7, wherein the baseline screenshot is specific to a particular device profile.

14. One or more computer storage media having computer-executable instructions embodied thereon that, when executed, configure a computing device to perform a method of detecting a visual regression caused by updated code, the method comprising:

receiving, at a centralized testing module, an updated version of a first program module for a program that generates a visible user interface, the program comprising multiple program modules including at least the first program module and a second program module;

running a test scenario that causes a virtual machine with a first device profile to communicate a simulated user interaction to a test version of the program comprising the updated version of the first program module in combination with a production version of other program modules in the program;

receiving, at the virtual machine, a test version of the visible user interface generated by the test version of the program;

generating a screenshot of the test version of the visible user interface; running a visual parity analysis on the screenshot against a baseline screenshot of the visible user interface;

determining that the screenshot does not have visual parity with the baseline screenshot of the visible user interface; and generating an error message indicating that the updated version of the first program module causes a visual regression of the visible user interface, wherein the test scenario includes test instructions for a plurality of virtual machines with different user device profiles, wherein the visual parity analysis compares only a portion of the screenshot to a portion of the baseline screenshot.

15. The media of claim 14, wherein the production version of the program includes a production version of the first program module, not the updated version of the first program module.

16. The media of claim 14, wherein the method further comprises generating the baseline screenshot by running the test scenario through the production version of the program.

17. The media of claim 14, wherein the program is a search engine.

18. The media of claim 14, wherein the baseline screenshot is specific to a particular device profile.

* * * * *